(12) United States Patent
Kawanishi et al.

(10) Patent No.: US 7,019,224 B2
(45) Date of Patent: Mar. 28, 2006

(54) POWDER WEIGHING APPARATUS AND POWDER WEIGHING METHOD

(75) Inventors: Shozo Kawanishi, Akashi (JP); Kazuo Usui, Akashi (JP); Atsushi Watanabe, Akashi (JP)

(73) Assignee: Yamato Scale Co., Ltd., Akashi (JP)

( * ) Notice: Subject to any disclaimer, the term of this patent is extended or adjusted under 35 U.S.C. 154(b) by 207 days.

(21) Appl. No.: 10/417,945

(22) Filed: Apr. 16, 2003

(65) Prior Publication Data

US 2003/0192723 A1   Oct. 16, 2003

(30) Foreign Application Priority Data

Apr. 16, 2002  (JP)  ............... 2002-113211

(51) Int. Cl.
G01G 19/387 (2006.01)
G01G 13/00 (2006.01)

(52) U.S. Cl. .................. 177/25.18; 177/103; 222/77

(58) Field of Classification Search ............. 177/25.18, 177/103; 222/55, 67, 77, 56
See application file for complete search history.

(56) References Cited

U.S. PATENT DOCUMENTS

| | | | | |
|---|---|---|---|---|
| 4,569,446 A | * | 2/1986 | Kelley | 209/660 |
| 4,828,054 A | * | 5/1989 | Mosher | 177/25.18 |
| 4,840,240 A | * | 6/1989 | Toyoda et al. | 177/25.18 |
| 4,880,142 A | * | 11/1989 | Higuchi et al. | 222/56 |
| 4,967,856 A | * | 11/1990 | Kawanishi et al. | 177/25.18 |
| 5,048,623 A | * | 9/1991 | Toyoda | 177/25.18 |
| 5,894,111 A | | 4/1999 | Kawanishi | 177/25.18 |
| 5,910,646 A | | 6/1999 | Kawanishi | 177/25.18 |
| 5,981,882 A | | 11/1999 | Kawanishi | 177/25.18 |

FOREIGN PATENT DOCUMENTS

| | | |
|---|---|---|
| JP | 08-240475 | 9/1996 |
| JP | 08-278188 | 10/1996 |
| JP | 08-278189 | 10/1996 |
| JP | 08-313327 | 11/1996 |
| JP | 08-313328 | 11/1996 |

* cited by examiner

Primary Examiner—Randy W. Gibson
(74) Attorney, Agent, or Firm—Alleman Hall McCoy Russell & Tuttle LLP

(57) ABSTRACT

A powder-weighing apparatus and a powder-weighing method having a high weighing speed and a high weighing accuracy are provided. For weighing powder within a predetermined allowable range of a target weight Wt, the powder-weighing apparatus may be configured to have a primary-charge weighing portion for weighing and retaining a weight W1 of primary-charge powder smaller than the target weight Wt and at least two auxiliary-charge weighing portions each for weighing and retaining a weight W2 of auxiliary-charge powder within a predetermined range of an auxiliary-charge weight Ws. When a weight W1 of the powder retained in the primary-charge weighing portion is smaller than a lower limit of the predetermined allowable range of the target weight Wt, one of the two weights W2 may be selected so that a sum (W1+W2) becomes closest to the target weight Wt, and the powder retained in the primary-charge weighing portion and the powder retained in the selected auxiliary-charge weighing portion are discharged.

15 Claims, 12 Drawing Sheets

POWDER WEIGHING APPARATUS AND POWDER WEIGHING METHOD

FIELD OF THE INVENTION

The present invention relates to a powder-weighing apparatus and a powder-weighing method, and more specifically to a powder-weighing apparatus and a powder-weighing method that are capable of weighing a powdery or granular article with a high degree of accuracy by separately weighing a powder for primary-charge and at least two powders for auxiliary-charge.

BACKGROUND OF THE INVENTION

Conventionally, a powder-weighing apparatus shown in FIG. 4 has been used to weigh powder. This powder-weighing apparatus includes a weighing hopper 13 for retaining powder. Powder is charged from a charging device 15 to this weighing hopper 13, and a load cell 12 measures the weight of the powder retained inside the weighing hopper 13. As such a powder-weighing apparatus, a weighing apparatus having a two-stage charge system has been employed to improve its weighing speed and weighing accuracy. FIG. 5 shows a relationship between charge amounts, charge flow rates, and charge times in the two-stage charge system. As shown in FIG. 5, in a weighing apparatus having a two-stage charge system, for the purpose of increasing its weighing speed, powder is charged into a weighing hopper at a high flow rate until a weighed value of the powder reaches approximately 90% of a target weight (100%) (quick-charge step), and the remaining 10% of the powder is charged into the weighing hopper at a low flow rate (slow-charge step).

In such a weighing apparatus having a two-stage charge system, ways to further increase its weighing speed while maintaining its weighing accuracy are, for example, (1) to further increase a powder amount to be charged in a quick-charge step from the above-mentioned approximately 90%, or (2) to increase a flow rate of powder to be weighed in a quick-charge step. However, in (1), where a powder amount to be charged in a quick-charge step is increased, overshooting takes place during the changeover from a powder flow rate in the quick-charge step to a powder flow rate in the slow-charge step, resulting in a situation in which the slow-charge step is not executed because the target weight is assumed to be reached. In this case, a final weight of the powder to be obtained is far below the target weight. Similarly, in (2), where a powder flow rate in a quick-charge step is increased, overshooting takes place during the changeover from a powder flow rate in a quick-charge step to a powder flow rate in a slow-charge step, thereby resulting in a situation in which a final weight of the powder to be obtained is below the target weight. In addition, since a controller is necessary to change over from a quick-charge step to a slow-charge step, there is such a drawback that the cost of the weighing apparatus becomes high. Furthermore, since the time-consuming slow-charge step must be executed to ensure the weighing accuracy, there is such a problem that the weighing speed can not be increased above a certain level.

In order to solve the shortcomings of a weighing apparatus having a two-stage charge system, weighing apparatuses having a stageless charge system have been developed. FIG. 7 shows a relationship among charge amounts, charge flow rates, and charge times in a stageless charge system. In the stageless charge system, for the purpose of avoiding overshooting during the changeover from a powder flow rate in a quick-charge step to a powder flow rate in a slow-charge step, a powder charge flow rate is controlled so as to continuously decrease from a powder flow rate in the quick-charge step to a powder flow rate in the slow-charge step based on a predetermined function. However, realization of such a weighing apparatus having a stageless charge system requires a controller for controlling difficult stageless changeover from a powder flow rate in a quick-charge step to a powder flow rate in a slow-charge step, thereby increasing the cost of the weighing apparatus. Furthermore, similarly to the two-stage charge system described above, a time-consuming slow-charge step must be executed to ensure its weighing accuracy, and therefore there is such a problem that its weighing speed can not be increased above a certain level. The maximum performance of a weighing apparatus of this system is approximately 12–15 bags/min.

SUMMARY OF THE INVENTION

The present invention has been made to solve these problems of the conventional technologies, and an object thereof is to provide a powder-weighing apparatus and a powder-weighing method having a high weighing speed and a high weighing accuracy.

A powder-weighing apparatus of the present invention is a powder-weighing apparatus for weighing powder within a predetermined allowable range of a target weight Wt and comprises a primary-charge weighing portion for weighing and retaining a weight W1 of primary-charge powder within a predetermined allowable range of the target weight Wt and one auxiliary-charge weighing portion for weighing and retaining a weight W2 of auxiliary-charge powder within a predetermined range of an auxiliary-charge weight Ws. In the above-mentioned powder-weighing apparatus, when the weight W1 of the powder retained in the primary-charge weighing portion is within the predetermined allowable range of the target weight Wt, the powder retained only in the primary-charge weighing portion is discharged. When the weight W1 of the powder retained in the primary-charge weighing portion is less than a lower limit of the predetermined allowable range of the target weight Wt, the powder retained in the primary-charge weighing portion and the auxiliary-charge weighing portion is discharged.

As shown in the preceding description, there are provided a primary-charge weighing portion and one auxiliary-charge weighing portion, and powder is charged into the primary-charge weighing portion aiming at a target weight Wt as target. When an actual weight W1 of the powder charged into the primary-charge weighing portion is smaller than the target weight Wt, the powder can be discharged from the auxiliary-charge weighing portion as well, thus constituting a powder-weighing apparatus having not only a high weighing accuracy but also a high weighing speed.

Alternatively, a powder-weighing apparatus for weighing powder within a predetermined allowable range of a target weight Wt comprises a primary-charge weighing portion for weighing and retaining a weight W1 of primary-charge powder smaller than the target weight Wt and one auxiliary-charge weighing portion for weighing and retaining a weight W2 of auxiliary-charge powder within a predetermined range of an auxiliary-charge weight Ws. In the above-mentioned powder-weighing apparatus, powder is charged in such a way that a sum W1+W2 of a weight W1 of the powder in the primary-charge weighing portion and a weight W2 of the powder in the auxiliary-charge weighing portion becomes within the predetermined allowable range of the target weight Wt. When the sum W1+W2 of the weight W1 of the powder retained in the primary-charge weighing portion and the weight W2 of the powder retained in the auxiliary-charge weighing portion is within the predetermined allowable range of the target weight Wt, the powder retained in the primary-charge weighing portion and the auxiliary-charge weighing portion is discharged. When the sum W1+W2 is larger than an upper limit of the predetermined allowable range of the target weight Wt, the powder retained only in the primary-charge weighing portion is discharged without discharging the powder from the auxiliary-charge weighing portion.

As shown in the preceding description, there are provided a primary-charge weighing portion and one auxiliary-charge weighing portion, and powder is charged into the primary-charge weighing portion and the one auxiliary-charge weighing portion aiming at a target weight Wt as target. When an actual sum W1+W2 of the powder charged into the primary-charge weighing portion and the one auxiliary-charge weighing portion is larger than the target weight Wt, the powder is discharged only from the primary-charge weighing portion, thus constituting a powder-weighing apparatus having not only a high weighing accuracy but also a high weighing speed.

The powder-weighing apparatus according of the present invention may comprise a powder charging device for charging powder into the primary-charge weighing portion and the one auxiliary-charge weighing portion. Through the provision of one powder-charging device for charging powder into a primary-charge weighing portion and an auxiliary-charge weighing portion, a conventional powder-weighing apparatus having no auxiliary-charge weighing portion can easily be converted into the powder-weighing apparatus of the present invention having an auxiliary-charge weighing portion.

Furthermore, the powder-weighing apparatus of the present invention may comprise a powder-charging device for charging powder into the primary-charge weighing portion and another powder-charging device for charging powder into the auxiliary-charge weighing portions. Through the provision of separate powder-charging devices for a primary-charge weighing portion and a plurality of auxiliary-charge weighing portions, a powder charge amount can be set finely for each of the powder-charging devices, thereby further improving weighing accuracy.

Alternatively, a powder-weighing apparatus for weighing powder within a predetermined allowable range of a target weight Wt comprises a primary-charge weighing portion for weighing and retaining a weight W1 of primary-charge powder smaller than the target weight Wt and at least two auxiliary-charge weighing portions each for weighing and retaining a weight W2 of auxiliary-charge powder within a predetermined range of an auxiliary-charge weight Ws. In the above-mentioned powder-weighing apparatus, powder is charged in such a way that a sum W1+W2 of a weight W1 of the powder in the primary-charge weighing portion and a weight W2 of the powder in one of the two auxiliary-charge weighing portions becomes within the predetermined allowable range of the target weight Wt. When the sum W1+W2 of the weight W1 of the powder retained in the primary-charge weighing portion and the weight W2 of the powder retained in the one of the two auxiliary-charge weighing portion is within the predetermined allowable range of the target weight Wt, the powder retained in the primary-charge weighing portion and the one of the two auxiliary-charge weighing portions is discharged. When the sum W1+W2 of the weight W1 of the powder retained in the primary-charge weighing portion and the weight W2 of the powder retained in the one of the two auxiliary-charge weighing portions is smaller than a lower limit of the predetermined allowable range of the target weight Wt, the powder retained in the other of the two auxiliary-charge weighing portions is discharged in addition to the powder retained in the primary-charge weighing portion and the one of the two auxiliary-charge weighing portions. When the sum W1+W2 of the weight W1 of the powder retained in the primary-charge weighing portion and the weight W2 of the powder retained in the one of the two auxiliary-charge weighing portions is larger than an upper limit of the predetermined allowable range of the target weight Wt, the powder retained only in the primary-charge weighing portion is discharged without discharging the powder from the one of the two auxiliary-charge weighing portions.

As shown in the preceding description, powder is charged into a primary-charge weighing portion and one of auxiliary-charge weighing portions collectively aiming at a target weight Wt. When a sum W1+W2 of a weight of the powder retained in the primary-charge weighing portion and a weight of the powder retained in the one of auxiliary-charge weighing portions is smaller than the target weight Wt, the powder retained in one of the other auxiliary-charge weighing portions is discharged in addition to the powder retained in the primary-charge weighing portion and the one of auxiliary-charge weighing portions, thus constituting a powder-charging device having not only high weighing accuracy but also high weighing speed. Furthermore, when the sum W1+W2 of the weight of the powder retained in the primary-charge weighing portion and the weight of the powder retained in the one of auxiliary-charge weighing portions is larger than the target weight Wt, the powder retained only in the primary-charge weighing portion can be discharged, thereby further improving the weighing accuracy of the powder charging device.

The powder-weighing apparatus according to the present invention may comprise a powder-charging device for charging powder to the primary-charge weighing portion and the at least two auxiliary-charge weighing portions. Through the provision of one powder-charging device for charging powder into a primary-charge weighing portion and at least two auxiliary-charge weighing portions, a conventional powder-weighing apparatus having no auxiliary-charge weighing portion can easily be converted into the powder-weighing apparatus of the present invention having auxiliary-charge weighing portions.

The powder-weighing apparatus according to the present invention may comprise a powder-charging device for charging powder to the primary-charge weighing portion and a plurality of powder-charging devices for respectively charging the at least two auxiliary-charge weighing portions. Through the provision of powder charging devices respectively for a primary-charge weighing portion and a plurality of auxiliary-charge weighing portions, a powder charge amount can be set finely for each of the charging devices, thereby further improving weighing accuracy.

Furthermore, with the constitution described above, in the case where the powder is made of granular material, the auxiliary-charge weight Ws may be in integral multiples of an average weight of one particle of the granular material. With the auxiliary-charge weight Ws being integral multiples of an average weight of one particle of the granular material, the weighing accuracy can be improved even when the auxiliary-charge weight Ws is small.

A powder-weighing method of the present invention is a powder-weighing method for weighing powder within a predetermined allowable range of a target weight Wt and comprises the steps of weighing a weight W1 of primary-charge powder within the predetermined allowable range of the target weight Wt, weighing a weight W2 of auxiliary-charge powder within a predetermined range of an auxiliary-charge weight Ws, discharging only the primary-charge powder when the weight W1 of the primary-charge powder is within the predetermined allowable range of the target weight Wt, and discharging the primary-charge powder and the auxiliary-charge powder when the weight W1 of the primary-charge powder is smaller than a lower limit of the predetermined allowable range of the target weight Wt.

As shown in the preceding description, the primary-charge powder and the one auxiliary-charge powder are weighed, with the weight of the primary-charge powder aiming at a target weight Wt as target. When an actual weight W1 of the primary-charge powder is smaller than the target weight Wt, the auxiliary-charge powder is also discharged, thereby constituting a powder-charging method having not only high weighing accuracy, but also high weighing speed.

Alternatively, a powder-weighing method of the present invention is a powder-weighing method for weighing powder within a predetermined allowable range of a target weight Wt and comprises the steps of charging powder in such a way that a sum W1+W2 of a weight W1 of primary-charge powder smaller than the target weight Wt and a weight W2 of one auxiliary-charge powder within an allowable range of an auxiliary-charge weight Ws becomes within the predetermined allowable range of the target weight Wt, discharging the primary-charge powder and the auxiliary-charge powder when the sum W1+W2 is within the predetermined allowable range of the target weight Wt, and discharging only the primary-charge powder when the sum W1+W2 is larger than an upper limit of the predetermined allowable range of the weight Wt.

As shown in the preceding description, primary-charge powder and one auxiliary-charge powder are weighed, with the sum of a weight of the primary-charge powder and a weight of the auxiliary-charge powder aiming at the target weight Wt as target. When the sum W1+W2 of a weight of the primary-charge powder and a weight of the auxiliary-charge powder is larger than the target weight Wt, only the primary-charge powder is discharged, thereby constituting a powder-charging method having not only high weighing accuracy but also high weighing speed.

Alternatively, a powder-weighing method of the present invention is a powder-weighing method for weighing powder within a predetermined allowable range of a target weight Wt by weighing primary-charge powder smaller than the target weight Wt and at least two auxiliary-charge powders within a predetermined range of an auxiliary-charge weight Ws and comprises the steps of charging powder in such a way that a sum W1+W2 of a weight W1 of the primary-charge powder smaller than the target weight Wt and a weight W2 of one of the at least two auxiliary-charge powders within the predetermined range of the auxiliary-charge weight Ws becomes within the predetermined allowable range of the target weight Wt, discharging the primary-charge powder and the one of the at least two auxiliary-charge powders when the sum W1+W2 of the weight W1 of the primary-charge powder and the weight W2 of the one of the at least auxiliary-charge powder is within the predetermined allowable range of the target weight Wt, discharging the other of the at least two auxiliary-charge powders in addition to the primary-charge powder and the one of the at least two auxiliary-charge powders when the sum W1+W2 of the weight W1 of the primary-charge powder and the weight W2 of the one of the at least two auxiliary-charge powders is smaller than a lower limit of the predetermined allowable range of the target weight Wt, and discharging only the primary-charge powder without discharging the one of the at least two auxiliary-charge powders when the sum W1+W2 of the weight W1 of the primary-charge powder and the weight W2 of the one of the at least two auxiliary-charge powders is larger than an upper limit of the predetermined allowable range of the target weight Wt.

As shown in the preceding description, the sum of the weight of the primary-charge powder and the weight of the one of the auxiliary-charge powders aims at the target weight Wt as target. When the sum W1+W2 of the weight of the primary-charge powder and the weight of the one of the two auxiliary-charge powders is smaller than the target weight Wt, the other of the two auxiliary-charge powders is discharged in addition to the primary-charge powder and the one of the auxiliary-charge powders, thereby constituting a powder-charging method having not only high weighing accuracy but also high weighing speed. When the sum W1+W2 is larger than the target weight Wt, only the primary-charge powder can be discharged, thereby improving the weighing accuracy of the powder-charging method.

Also, with the constitution described above, in the case where the powder is made of granular material, the auxiliary-charge weight Ws may be in integral multiples of an average weight of one particle of the granular material. With the auxiliary-charge weight Ws being integral multiples of an average weight of one particle of the granular material, the weighing accuracy can be improved even when the auxiliary-charge weight Ws is small.

DETAILED DESCRIPTION OF THE PREFERRED EMBODIMENTS

Figure 1:
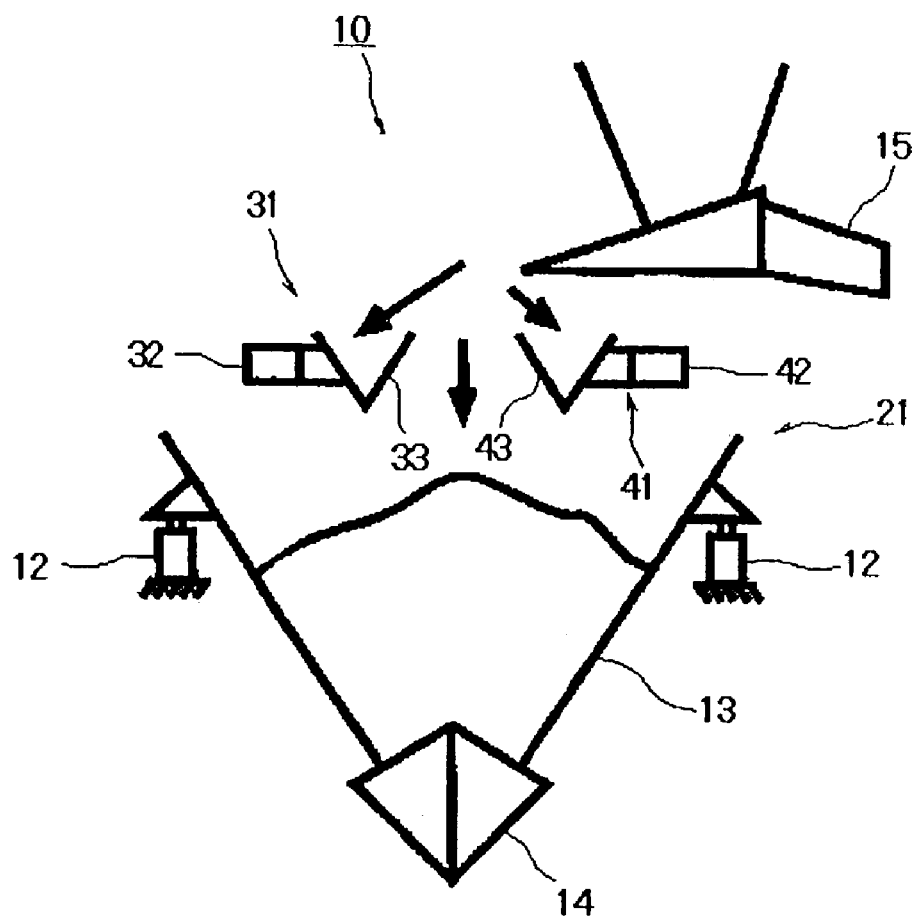
FIG. 1 is a side elevation view schematically showing a general constitution of a powder-weighing apparatus according to one embodiment of the present invention.

Hereinbelow, embodiments of the present invention will be described with reference to the drawings. FIG. 1 is a side elevation view schematically showing a general constitution of a powder-weighing apparatus according to one embodiment of the present invention. The powder-weighing apparatus 10 according to the present embodiment weighs powder within a predetermined allowable range of a target weight Wt and has a primary-charge weighing portion 21 and a first auxiliary-charge weighing portion 31 and a second auxiliary-charge weighing portion 41. The primary-charge weighing portion 21 includes a primary-charge weighing hopper 13 and a load cell 12 for measuring the weight of powder retained in the primary-charge weighing hopper 13. A gate 14 for discharging powder is provided in a lower portion of the primary-charge weighing hopper 13. The first auxiliary-charge weighing portion 31 includes a first auxiliary-charge weighing hopper 33 and a load cell 32, and the second auxiliary-charge weighing portion 41 includes a second auxiliary-charge weighing hopper 43 and a load cell 42. Furthermore, the powder-weighing apparatus 10 according to the present embodiment has a primary-charge weighing hopper 13 and a charge device 15 for charging powder into the first auxiliary-charge weighing hopper 33 and the second auxiliary-charge weighing hopper 43.

In the powder-weighing apparatus 10 according to the present embodiment, powder is charged aiming at a target weight Wt as target from the charge device 15 into the primary-charge weighing hopper 13 of the primary-charge weighing portion 21 and the first auxiliary-charge weighing hopper 33 of the first auxiliary-charge weighing portion 31. According to the present embodiment, the first auxiliary-charge weighing hopper 33 is set such that powder is charged aiming at an auxiliary-charge weight Ws as target. An actual primary-charge powder weight W1 charged into the primary-charge weighing hopper 13 is measured by the load cell 12, and an actual primary-charge powder weight W21 charged into the first auxiliary-charge weighing hopper 33 is measured by the load cell 32.

Also, into the second auxiliary-charge weighing hopper 43, powder is charged from the charge device 15 aiming at the same auxiliary-charge weight Ws as the weight of powder charged into the first auxiliary-charge weighing hopper 33 as target. An actual auxiliary-charge powder weight 22 charged into the second auxiliary-charge weighing hopper 43 is measured by the load cell 42.

In the powder-weighing apparatus 10 according to the present embodiment, powder retained in the primary-charge weighing hopper 13 and the first auxiliary-charge weighing hopper 33 is discharged when a sum (W1+W21) of a weight W1 of powder retained in the primary-charge weighing hopper 13 of the primary-charge weighing portion 21 and a weight W21 of powder retained in the first auxiliary-charge weighing portion 31 is within the predetermined allowable range of the target weight Wt. When the sum W1+W21 of a weight W1 of powder in the primary-charge weighing hopper 13 and a weight W21 of powder in the first auxiliary-charge weighing hopper 33 is smaller than a lower limit of the predetermined allowable range of the target weight Wt, the powder retained in the second auxiliary-charge weighing hopper 43 is discharged in addition to the powder retained in the primary-charge weighing hopper 13 and the first auxiliary-charge weighing hopper 33. Furthermore, the powder retained in the first auxiliary-charge weighing hopper 33 is discharged. When the sum W1+W21 of the weight W1 of powder in the primary-charge weighing hopper 13 of the primary-charge weighing portion 21 and the weight W21 of powder in the first auxiliary-charge weighing hopper 33 is larger than an upper limit of the predetermined allowable range of the target weight Wt, only the powder retained in the primary-charge weighing hopper 13 is discharged without discharging the powder from the first auxiliary-charge weighing hopper 33.

In the present embodiment, powder is charged in such a way that a sum W1+W21 of the primary-charge weighing hopper 13 and the first auxiliary-charge weighing hopper 33 comes within a predetermined allowable range of a target weight Wt. When the sum W1+W21 is lower than a target weight Wt, the powder not only in the primary-charge weighing hopper 13 and the first auxiliary-charge weighing hopper 33 but also in the second auxiliary-charge weighing hopper 43 is discharged. When the sum W1+W21 is higher than the target weight Wt, it is possible to discharge the powder only from the primary-charge weighing portion. In this way, it is possible not only to improve the weighing accuracy of the powder-weighing apparatus, but also to increase the weighing speed thereof.

Figure 9:
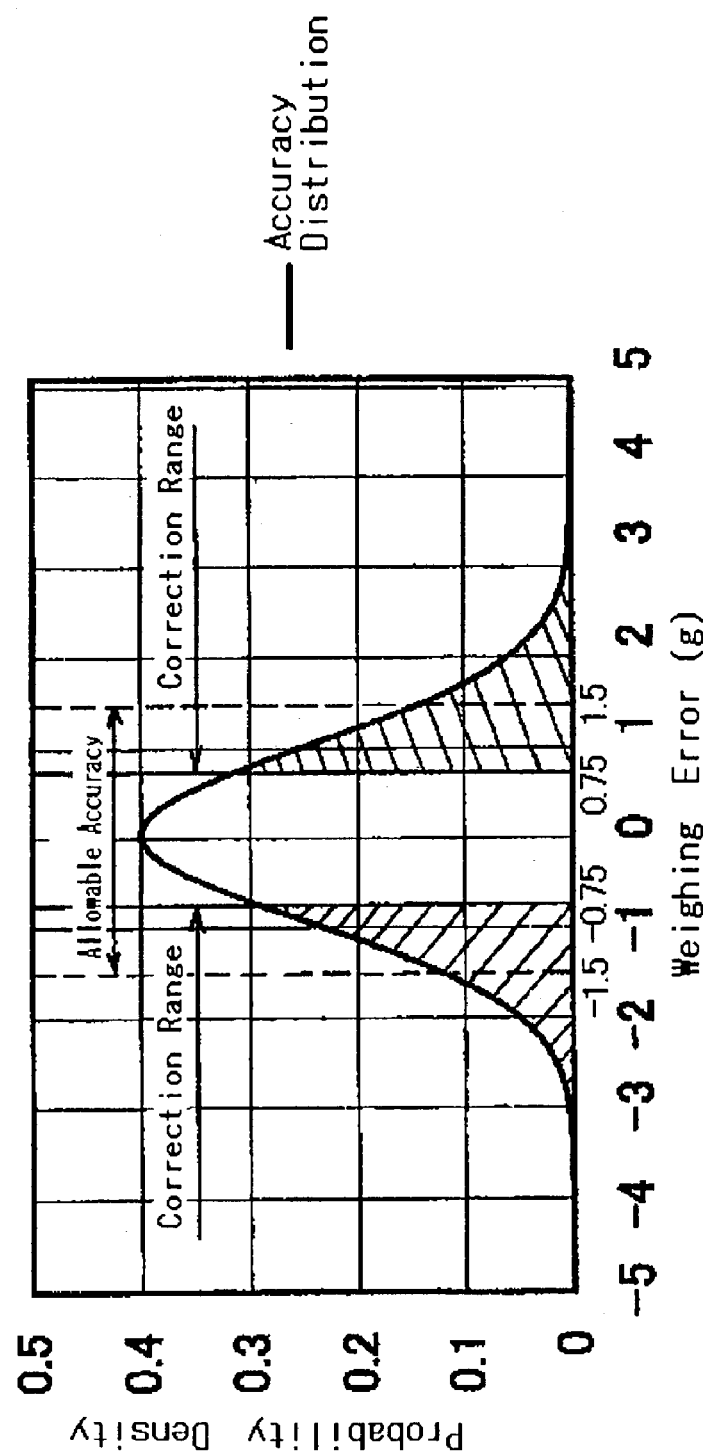
FIG. 9 is a view showing a relationship between weighing errors and probability densities in a case where powder is weighed using a single weighing hopper.
Figure 10:
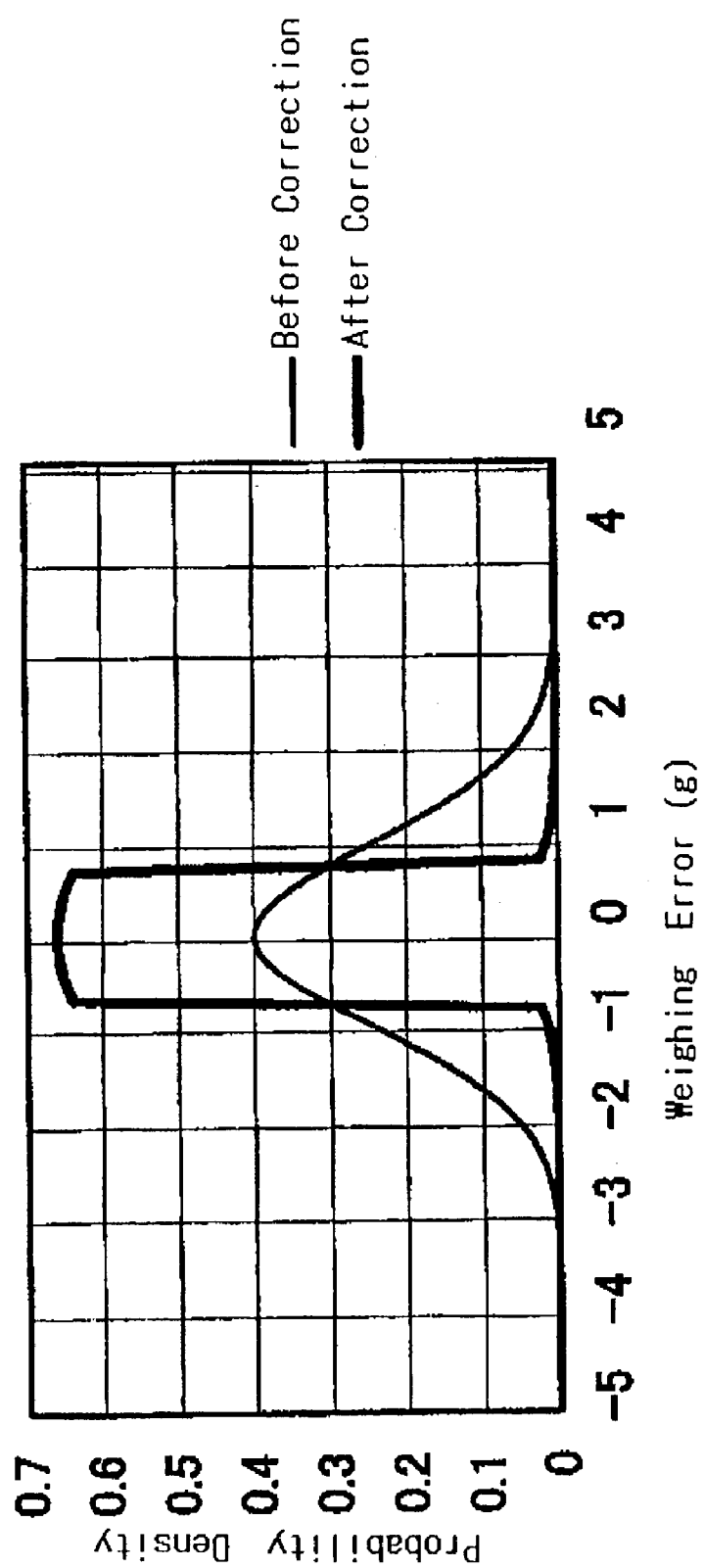
FIG. 10 is a view showing a relationship between weighing errors and probability densities in a case where a weighing hopper for primary charge, a first weighing hopper for auxiliary charge, and a second weighing hopper for auxiliary charge are used.

FIG. 9 shows a relationship between weighing errors and probability densities in the case where powder is weighed using a single weighing hopper. However, in weighing powder having such a relationship, if the above described operation is performed using a primary-charge weighing hopper and a first auxiliary-charge weighing hopper and a second auxiliary-charge weighing hopper, a new relationship between weighing errors and probability densities is developed as shown in FIG. 10. FIG. 10 shows a case where a target weight Wt is equal to 500 g, an auxiliary-charge weight Ws is equal to 1.5 g, and the following weighing operations are executed.

(1) When a sum (W1+W21) of a weight W1 of powder retained in the primary-charge weighing hopper 13 of the primary-charge weighing portion 21 and a weight W21 of powder in the first auxiliary-charge weighing portion 31 is within a target weight Wt+−0.75, no correction is made. This case corresponds to an operation in which powder is discharged from the primary-charge weighing hopper 13 and the first auxiliary-charge weighing hopper 33.

(2) When the sum (W1+W21) is more than a target weight Wt+0.75 g, a correction is made by subtracting 1.5 g from the sum, and the calculated result is treated as the weighed value. This case corresponds to an operation in which powder is discharged only from the primary-charge weighing hopper 13 but not discharged from the first auxiliary-charge weighing hopper 33 and the second auxiliary-charge weighing hopper 43.

(3) When the sum (W1+W21) is less than a target weight Wt−0.75 g, a correction is made by adding 1.5 g to the sum, and the calculated result is treated as the weighed value. This case corresponds to an operation in which powder is discharged from the primary-charge weighing hopper 13, the first auxiliary-charge weighing hopper 33, and the second auxiliary-charge weighing hopper 43.

Figure 3:
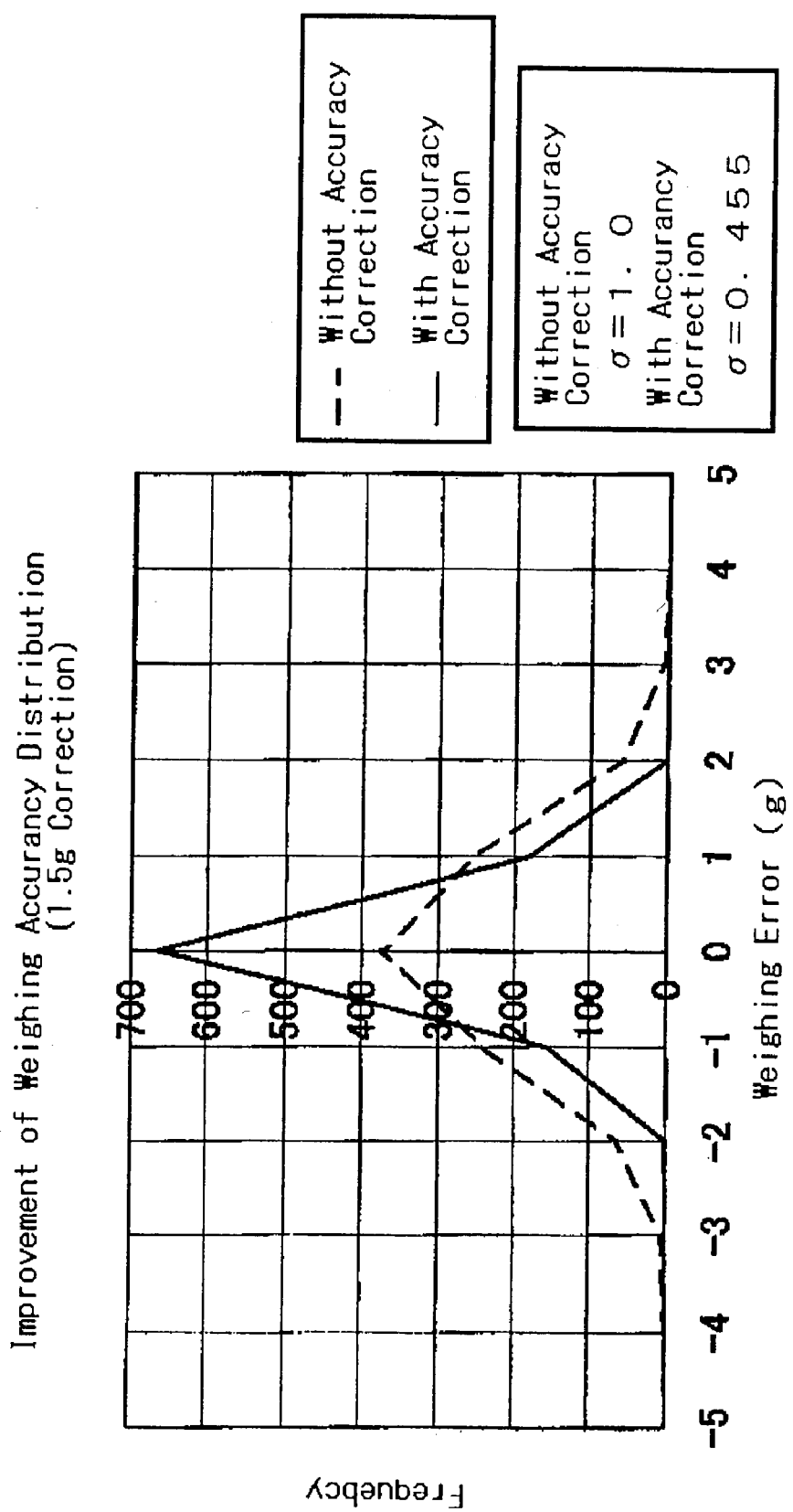
FIG. 3 is a view showing a weighing accuracy distribution in a case where the powder-weighing apparatus shown in FIG. 1 is used to perform weighing.
Figure 4:
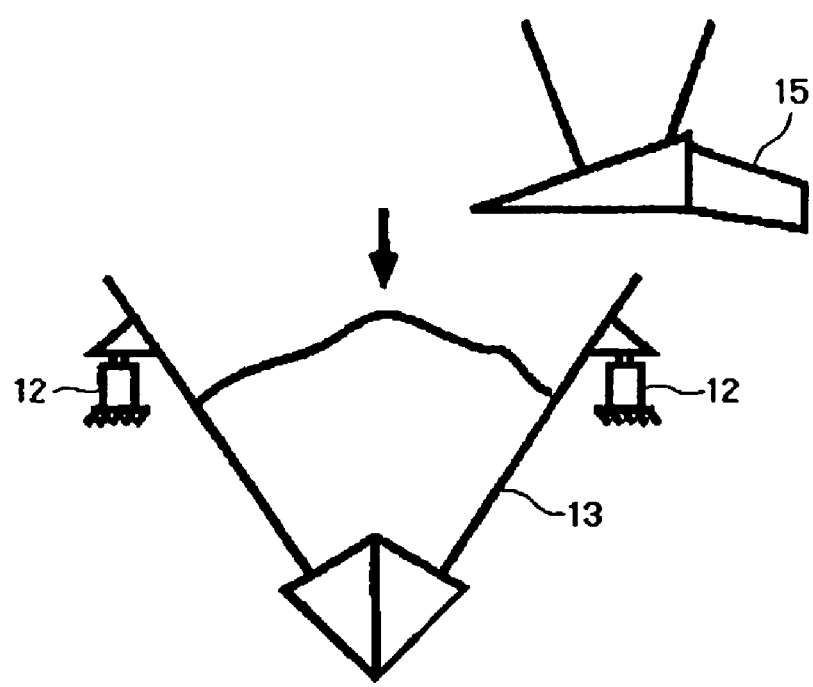
FIG. 4 is a side elevation view schematically showing a general constitution of a conventional powder-weighing apparatus.
Figure 5:
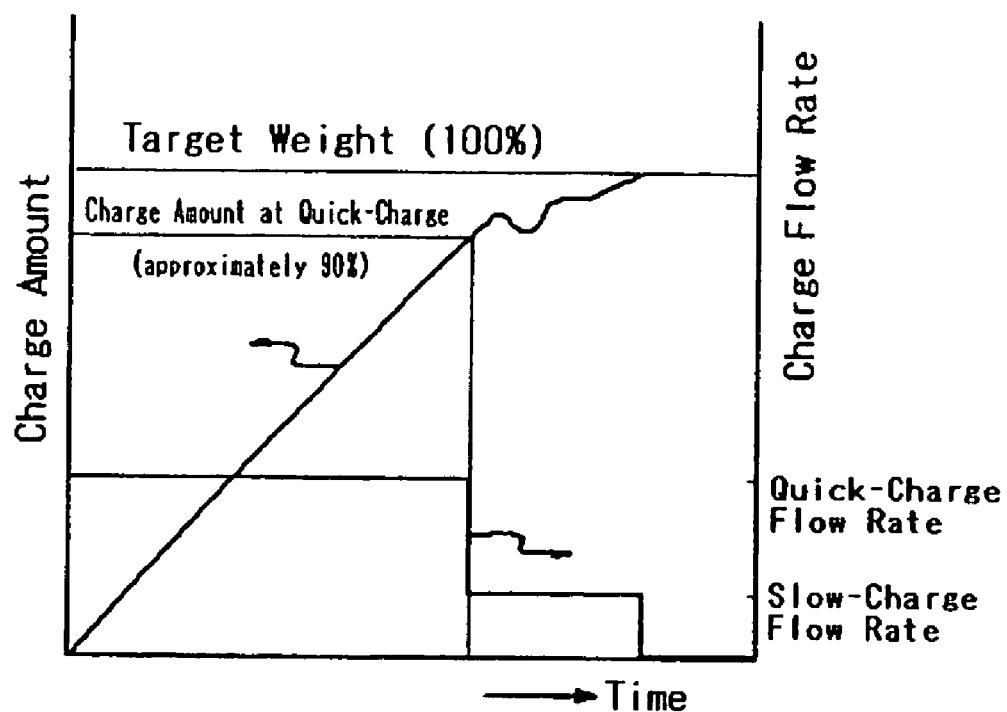
FIG. 5 is a view showing a relationship among charge amounts, charge flow rates, and charge times in a two-stage charge system.
Figure 6:
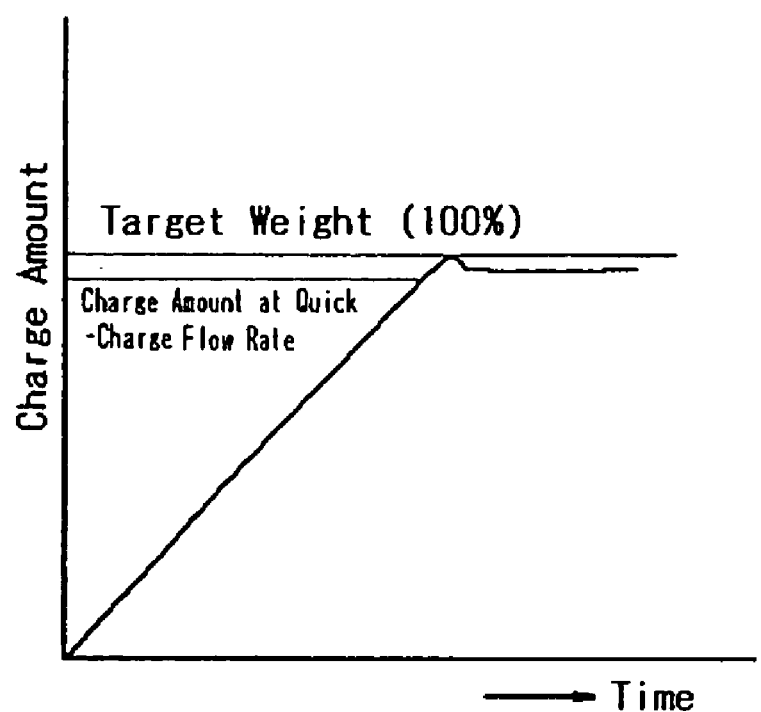
FIG. 6 is a view showing overshooting occurred during a changeover from a powder flow rate in a quick-charge step to a powder flow rate in a slow-charge step in a case where a powder amount charged in a quick-charge step is increased.
Figure 7:
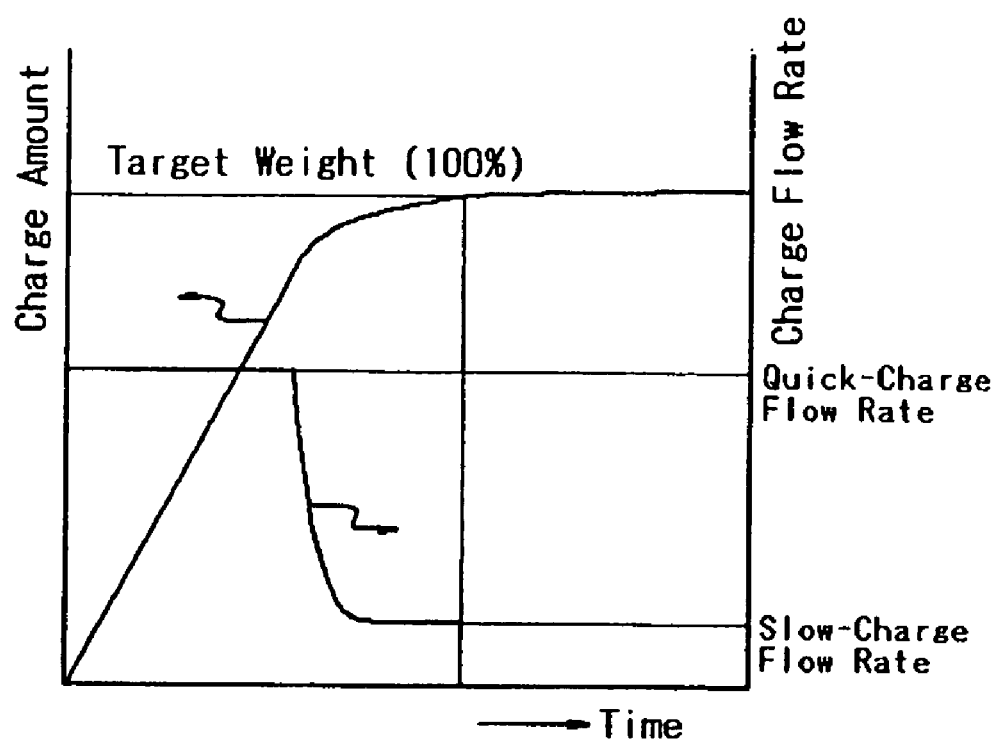
FIG. 7 is a view showing a relationship between charge amounts, charge flow rates, and charge times in a stage-less charge system.

FIG. 3 is a view showing to what extent the weighing accuracy distribution is improved when the above described operations (1) to (3) are performed using the powder-weighing apparatus shown in FIG. 1. The dotted line in FIG. 3 illustrates a case where random numbers are generated in such a way that an average value of the errors becomes 0 g and a standard deviation of the errors σ becomes 1 g. More specifically, the data of the dotted line were:

average of stopping errors at predetermined weight=0 g;
standard deviation of errors σ=1 g;
maximum error on minus side=−3.24 g; and
maximum error on plus side=+2.96 g.

The solid line in FIG. 3 illustrates to a weighing accuracy distribution when the above-described operations (1) to (3) is performed using the powder-weighing apparatus shown in FIG. 1. That is, the solid line data in FIG. 3 is data obtained by adding a correction weight of +−1.5 g when the sum is away from a target weight Wt by more than half of 1.5 g (0.75 g) with the powder weight charged to the first auxiliary-charge weighing hopper 33 and the second auxiliary-charge weighing hopper 43 being 1.5 g.

When an statistical analysis was performed on the data in the corrected solid-line frequency graph, the following results were obtained:

average of stopping errors at predetermined weight=0 g;
standard deviation of errors σ=0.455 g;
maximum error on minus side=−1.74 g; and
maximum error on plus side=+1.46 g.

It will be understood that the probability that the weighing accuracy is within +/−1 g was 84% in the case of the dotted line of FIG. 3 but increased to 99% through the correction described above, thus enabling the weighing accuracy to be dramatically increased.

In addition, differently from the conventional powder-weighing apparatuses, in the powder-weighing apparatus 10 according to the present embodiment, time-consuming changeover from a quick-charge step to a slow-charge step is not performed when powder is charged from the charge device 15 to the primary-charge weighing hopper 13 and the auxiliary-charge weighing hoppers 33, 43. Consequently, a powder-weighing apparatus capable of weighing at a high speed can be realized.

Figure 2:
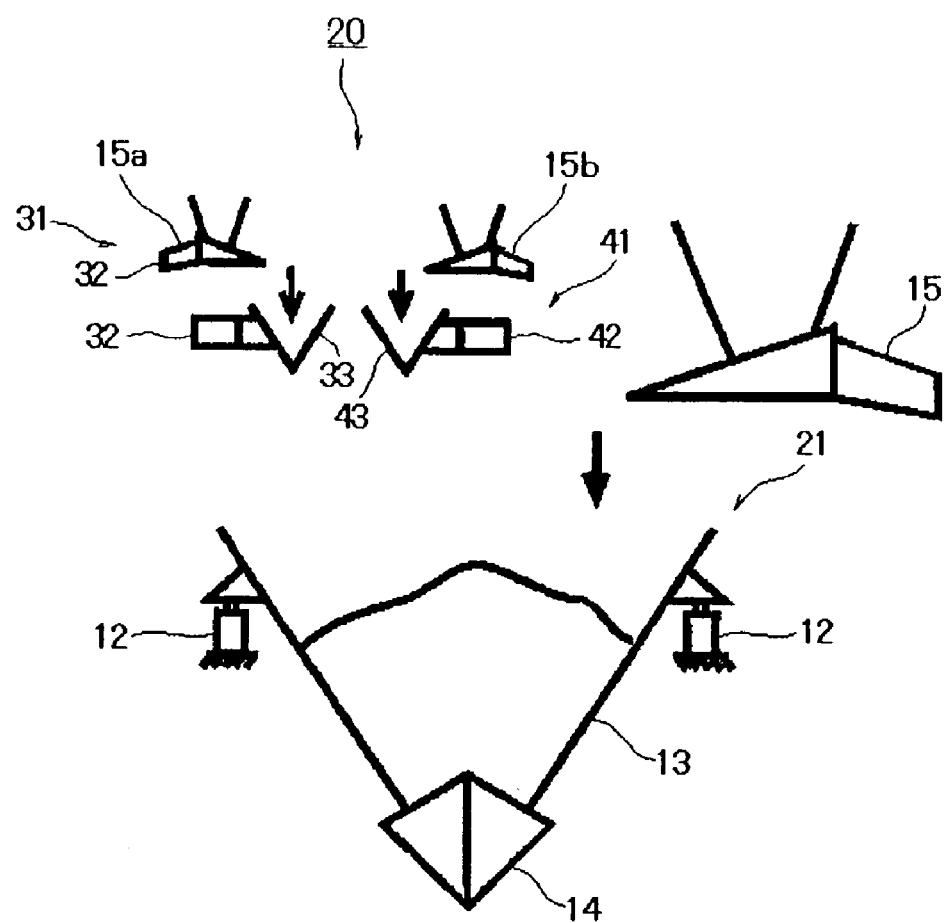
FIG. 2 is a side elevation view schematically showing a general constitution of a powder-weighing apparatus according to another embodiment of the present invention.

FIG. 2 is a side elevation view schematically showing a general constitution of a powder-weighing apparatus according to another embodiment of the present invention. In the powder-weighing apparatus according to the present embodiment 20, powder is charged from the charge device 15 of the previously-described powder-weighing apparatus 10 only to the primary-charge weighing hopper 13, and, additionally, charge devices 15a, 15b are respectively provided for charging powder to the first auxiliary-charge weighing hopper 33 and the second auxiliary-charge weighing hopper 43. The other parts are identical to those in FIG. 1, and corresponding parts are denoted by the same reference numerals.

In the powder-weighing apparatus according to the present embodiment 20, powder is separately charged to the primary-charge weighing hopper 13, the first auxiliary-charge weighing hopper 33, and the second auxiliary-charge weighing hopper 43, and, hence, the powder can be charged at suitable speeds depending on each volume of the hoppers, thereby enabling weights of the powder to be close to corresponding target weights. Consequently, accurate weighing of the powder is possible.

While the powder-weighing apparatus provided with two auxiliary-charge weighing portions were described above according to the present invention, the powder-weighing apparatus can be configured to further include an auxiliary-charge weighing portion.

Figure 8:
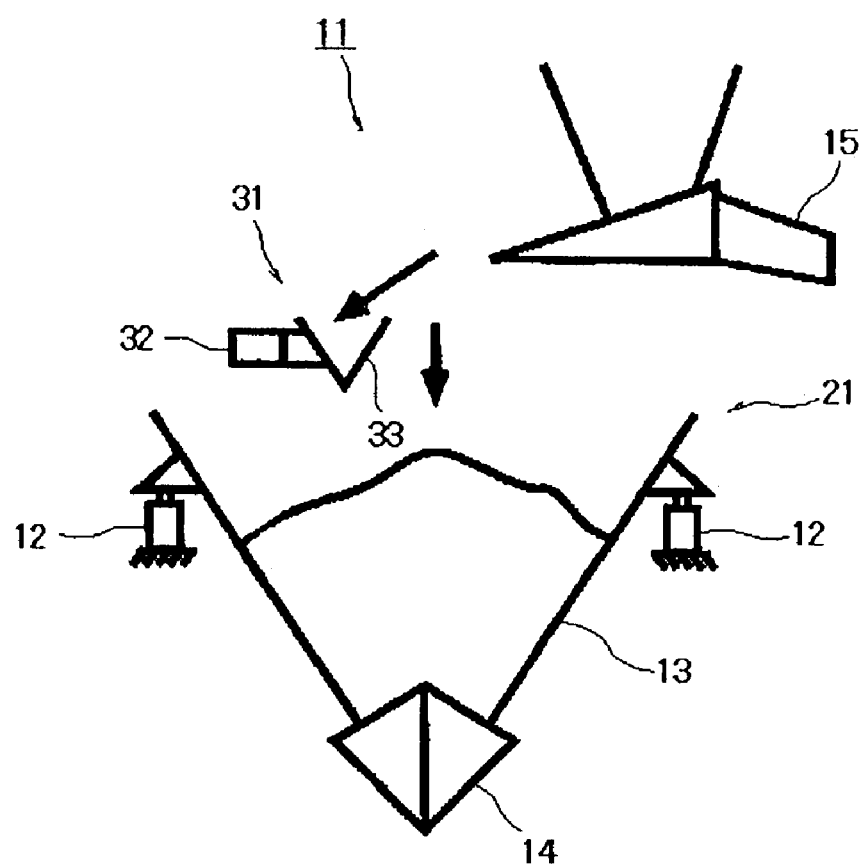
FIG. 8 is a side elevation view schematically showing a general constitution of a powder-weighing apparatus according to still another embodiment of the present invention.

FIG. 8 is a side elevation view schematically showing a general constitution of a powder-weighing apparatus according to still another embodiment of the present invention. Except that the second auxiliary-charge weighing portion 41 in the powder-weighing apparatus 10 shown in FIG. 1 is not provided, the powder-weighing apparatus 11 of the present embodiment is identical to the powder-weighing apparatus 1 of FIG. 1, and corresponding parts are denoted by the same reference numerals.

The powder-weighing apparatus 11 of the present embodiment is capable of performing either of the following two operations. That is, in a first operation, the first auxiliary-charge weighing hopper 33 of the primary-charge weighing portion 21 weighs and retains a weight W1 of primary-charge powder within a predetermined allowable range of Wt aiming at a target weight Wt as target. The first auxiliary-charge weighing hopper 33 of the first auxiliary-charge weighing portion 31 weighs and retains a weight W2 of auxiliary-charge powder within a predetermined allowable range of an auxiliary-charge weight Ws. When the weight Wt of powder retained in the primary-charge weighing hopper 13 is within a predetermined range of the target weight Wt, the powder retained only in the primary-charge weighing hopper 13 is discharged. When the weight W1 of powder retained in the primary-charge weighing hopper 13 is less than the predetermined range of the target weight Wt, the powder retained in the primary-charge weighing hopper 13 and the first auxiliary-charge weighing hopper 33 is discharged.

Figure 11:
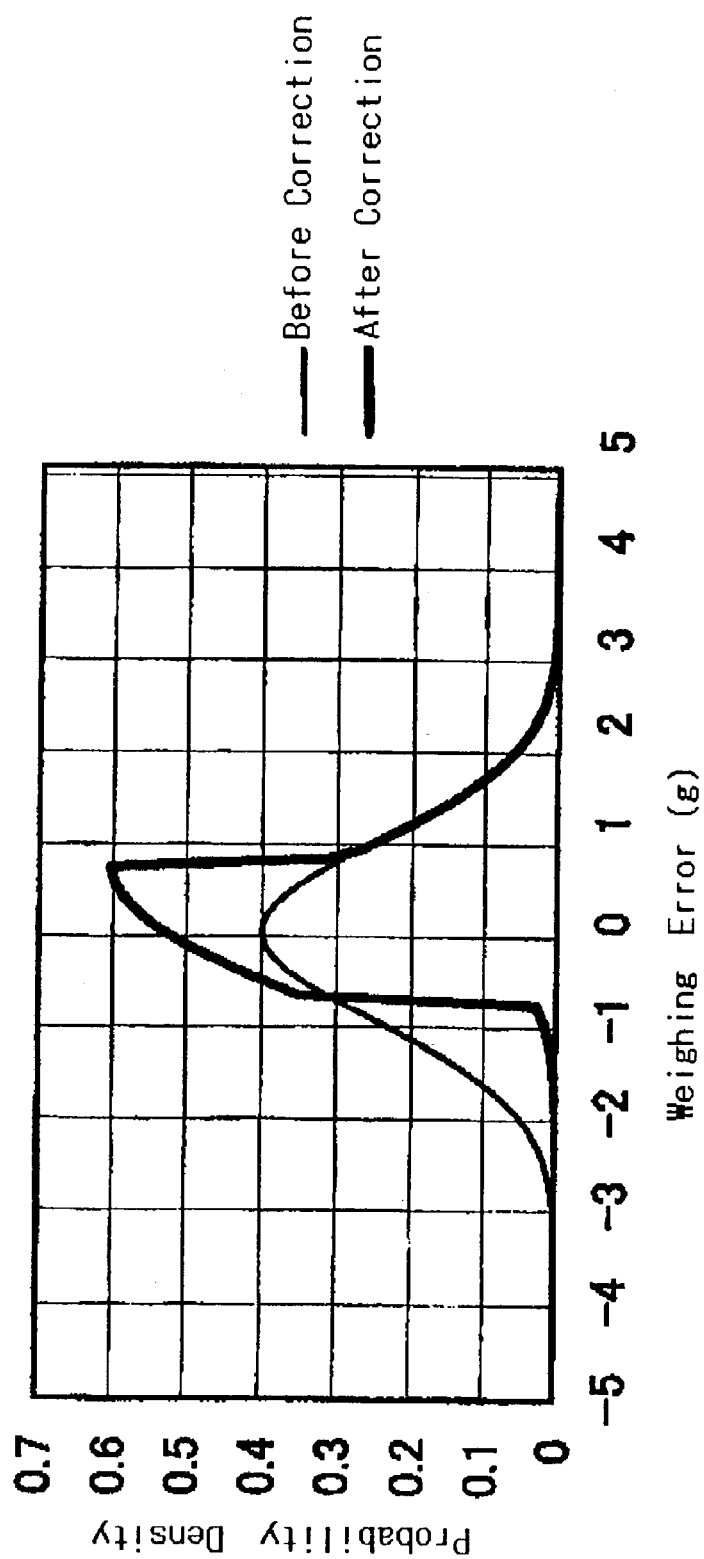
FIG. 11 is a view showing a relationship between weighing errors and probability densities in a powder-weighing apparatus in a case where a first operation is performed.

FIG. 11 is a graph showing a relationship between weighing errors and probability densities in the powder-weighing apparatus 11 when the first operation is performed. That is, the following operations are performed: (1) when the weight W1 of powder retained in the primary-charge weighing hopper 13 of the primary-charge weighing portion 21 is within a range of the target weight Wt +−0.75 g, powder is discharged only from the primary-charge weighing hopper 13 and (2) when the sum W1 is less than the target weight Wt −0.75 g, a correction is made by discharging 1.5 g powder from the first auxiliary-charge weighing hopper 33. As seen from FIG. 11, the probability densities in the vicinity of a weighing error of 0 can be increased through the first operation of the powder-weighing apparatus 11 of the present embodiment.

In a second operation, the primary-charge weighing hopper 13 of the primary-charge weighing portion 21 weighs and retains a weight W1 of primary-charge powder smaller than a target weight Wt, and the first auxiliary-charge weighing hopper 33 of the first auxiliary-charge weighing portion 31 weighs and retains a weight W2 of auxiliary-charge powder within a predetermined allowable range of an auxiliary-charge weight Ws. And, powder is charged from the charge device 15 in such a way that a sum W1+W2 of the weight W1 of powder in the primary-charge weighing hopper 13 and the weight W2 of powder in the first auxiliary-charge weighing hopper 33 becomes within a predetermined allowable range of a target weight Wt. When the sum W1+W2 is within the predetermined allowable range of the target weight Wt, the powder retained in the primary-charge weighing hopper 13 and the first auxiliary-charge weighing hopper 33 is discharged. When the sum W1+W2 is larger than an upper limit the predetermined allowable range of the target weight Wt, the powder retained only in the primary-charge weighing hopper 13 is discharged without discharging the powder from the first auxiliary-charge weighing hopper 33.

Figure 12:
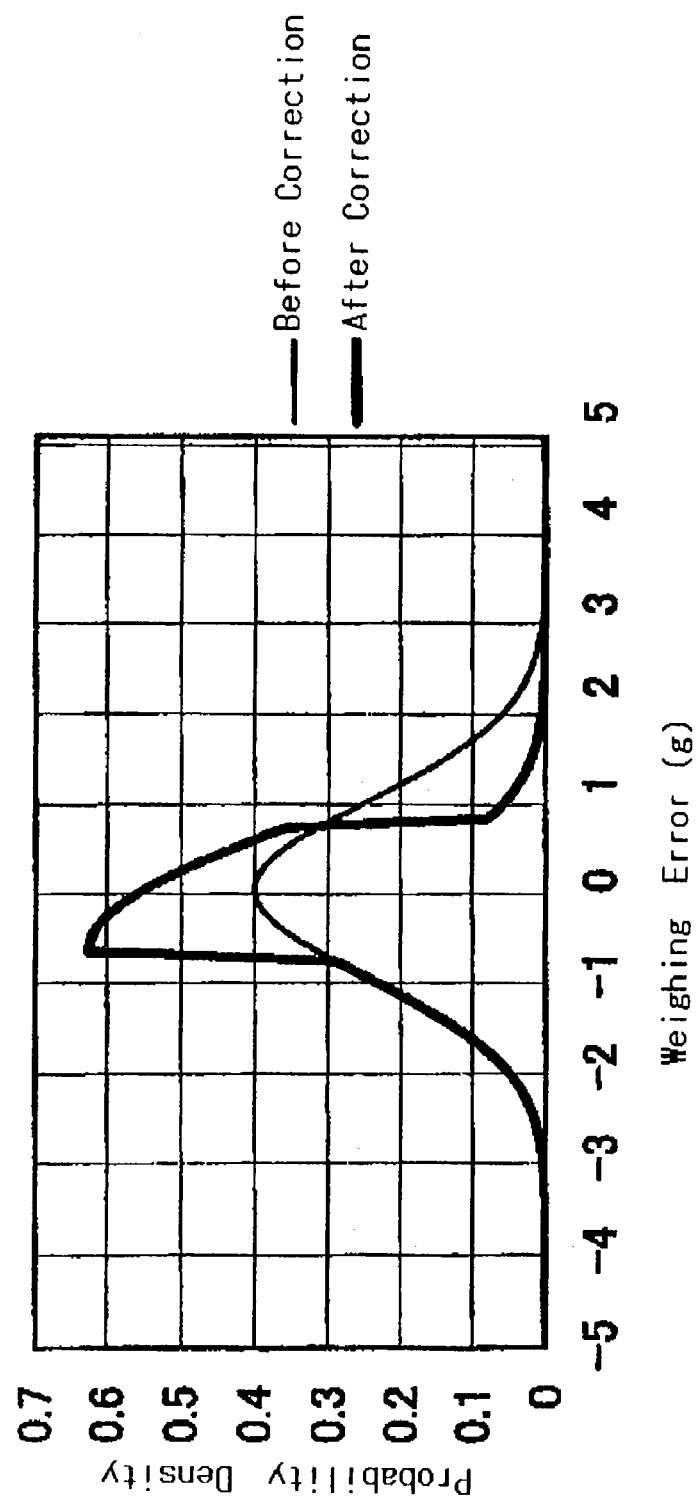
FIG. 12 is a view showing a relationship between weighing errors and probability densities in a powder-weighing apparatus in a case where a second operation is performed.

FIG. 12 is a view showing a relationship between weighing errors and probability densities of the powder-weighing apparatus 11 when the second operation is performed. That is, the following operations are performed: (1) when the sum W1+W21 of the weight of powder in the primary-charge weighing hopper 13 of the primary-charge weighing portion 21 and the weight of powder in the first auxiliary-charge weighing hopper 33 of the first auxiliary-charge weighing portion 31 is within the range of the target weight Wt+−0.75g, the powder is discharged from the primary-charge weighing hopper 13 and the first auxiliary-charge weighing hopper 33, and (2) when the sum W1+W21 is more than the target weight Wt+0.75 g, a correction is made by discharging the powder only from the primary-charge weighing hopper 13 without discharging approximately 1.5 g of the powder from the first auxiliary-charge weighing hopper 33. As seen from FIG. 12, the probability densities in the vicinity of a weighing error of 0 can also be increased through the second operation of the powder-weighing apparatus 11 of the present embodiment.

As seen from the preceding description, in such a constitution that the primary-charge weighing hopper 13 and the first auxiliary-charge weighing hopper 33 are provided, there can be achieved a powder-weighing apparatus having a simple structure, a high degree of weighing accuracy, and a high weighing speed.

It should be noted that, in the case where the powder is made of a granular material, an auxiliary-charge weight Ws can be in integral multiples of an average weight of one particle of the granular material. With the auxiliary-charge weight Ws being in integral multiples of an average weight of one particle of the granular material, the weighing accuracy can be improved even when the auxiliary-charge weight Ws is small.

EFFECTS OF THE INVENTION

In the powder-weighing apparatus according to the present invention, there are provided a primary-charge weighing portion and one auxiliary-charge weighing portion, and powder is charged into the primary-charge weighing portion aiming at a target weight Wt as target. When an actual weight W1 of the powder charged into the primary-charge weighing portion is smaller than the target weight Wt, the powder can be discharged from the auxiliary-charge weighing portion as well, thus constituting a powder-weighing apparatus having not only a high weighing accuracy but also a high weighing speed.

Also, powder is charged into the primary-charge weighing portion and the one auxiliary-charge weighing portion aiming at a target weight Wt as target. When the sum W1+W2 of the weight of the powder retained in the primary-charge weighing portion and the weight of the powder retained in the one of auxiliary-charge weighing portions is larger than the target weight Wt, the powder retained only in the primary-charge weighing portion is discharged, thus constituting a powder-weighing apparatus having not only a high weighing accuracy but also a high weighing speed.

Powder is charged into a primary-charge weighing portion and one of two auxiliary-charge weighing portions collectively aiming at a target weight Wt. When a sum W1+W2 of a weight of the powder retained in the primary-charge weighing portion and a weight of the powder retained in the one of the two auxiliary-charge weighing portions is smaller than the target weight Wt, the powder retained in the other of the two auxiliary-charge weighing portions is discharged in addition to the powder retained in the primary-charge weighing portion and the one of the two auxiliary-charge weighing portions, thus constituting a powder-weighing apparatus having not only a high weighing accuracy but also a high weighing speed. When the sum W1+W2 is larger than the target weight Wt, the powder retained only in the primary-charge weighing portion can be discharged, thereby constituting a powder-weighing apparatus having an even higher weighing accuracy.

In a powder-weighing method according to the present invention, a primary-charge powder and one auxiliary-charge powder are weighed, with the weight of the primary-charge powder aiming at a target weight Wt as target. When an actual weight W1 of the primary-charge powder is smaller than the target weight Wt, the auxiliary-charge powder is also discharged, thereby constituting a powder-weighing method having not only high weighing accuracy but also high weighing speed.

The primary-charge powder and the one auxiliary-charge powder are weighed, with the sum of a weight of the primary-charge powder and a weight of the auxiliary-charge powder aiming at the target weight Wt as target. When a sum W1+W2 of a weight of the primary-charge powder and a weight of the auxiliary-charge powder is larger than the target weight Wt, only the primary-charge powder is discharged, thereby constituting a powder charging method having not only high weighing accuracy but also high weighing speed.

Furthermore, the powder-weighing method according to the present invention, the sum of the weight of the primary-charge powder and the weight of the one of the auxiliary-charge powders aims at the target weight Wt as target. When the sum W1+W2 of the weight of the primary-charge powder and the weight of the one of the two auxiliary-charge powders is smaller than the target weight Wt, the other one of the two auxiliary-charge powders is discharged in addition to the primary-charge powder and the one of the auxiliary-charge powders, thereby achieving high weighing accuracy and high weighing speed. Furthermore, when the sum W1+W2 is larger than the target weight Wt, only the primary-charge powder can be discharged, thereby constituting a powder-charging method having an even higher weighing accuracy.

What is claimed is:

1. A powder-weighing apparatus for weighing powder within a predetermined allowable range of a target weight Wt, the apparatus comprising:
   a powder-charging device for continuously charging a powder;
   a primary-charge weighing portion having weighing means for weighing while the powder is being charged from the powder-charging device and retaining a weight W1 of primary-charge powder within the predetermined allowable range of the target weight Wt; and
   one auxiliary-charge weighing portion having weighing means for weighing while the powder is being charged from the powder-charging device and retaining a weight W2 of auxiliary-charge powder within a predetermined range of an auxiliary-charge weight Ws, wherein
   when the weight W1 of the powder retained in the primary-charge weighing portion is within the predetermined allowable range of the target weight Wt, the powder retained only in the primary-charge weighing portion is discharged, and when the weight W1 of the powder retained in the primary-charge weighing portion is less than a lower limit of the predetermined allowable range of the target weight Wt, the powder retained in the primary-charge weighing portion and the auxiliary-charge weighing portion is discharged.

2. A powder-weighing apparatus for weighing powder within a predetermined allowable range of a target weight Wt, the apparatus comprising:

a powder-charging device for continuously charging a powder;

a primary-charge weighing portion having weighing means for weighing while the powder is being charged from the powder-charging device and retaining a weight W1 of primary-charge powder within the predetermined allowable range of the target weight Wt;

another powder-charging device for continuously charging a powder; and one auxiliary-charge weighing portion having weighing means for weighing while the powder is being charged from the another powder-charging device and retaining a weight W2 of auxiliary-charge powder within a predetermined range of an auxiliary-charge weight Ws;

wherein, when the weight W1 of the powder retained in the primary-charge weighing portion is within the predetermined allowable range of the target weight Wt, the powder retained only in the primary-charge weighing portion is discharged, and when the weight W1 of the powder retained in the primary-charge weighing portion is less than a lower limit of the predetermined allowable range of the target weight Wt, the powder retained in the primary-charge weighing portion and the auxiliary-charge weighing portion is discharged.

3. The powder-weighing apparatus according to claim 1, wherein the powder is made of granular material, and the auxiliary-charge weight Ws is in integral multiples of an average weight of one particle of the granular material.

4. A powder-weighing apparatus for weighing powder within a predetermined allowable range of a target weight Wt, the apparatus comprising:

a powder-charging device for continuously charging a powder;

a primary-charge weighing portion having weighing means for weighing while the powder is being charged from the powder-charging device and retaining a weight W1 of primary-charge powder smaller than the target weight Wt; and one auxiliary-charge weighing portion having weighing means for weighing while the powder is being charged from the powder-charging device and retaining a weight W2 of auxiliary-charge powder within a predetermined range of an auxiliary-charge weight Ws, wherein powder is charged in such a way that a sum W1+W2 of a weight W1 of the powder in the primary-charge weighing portion and a weight W2 of the powder in the auxiliary-charge weighing portion becomes within the predetermined allowable range of the target weight Wt, when the sum W1+W2 of the weight W1 of the powder retained in the primary-charge weighing portion and the weight W2 of the powder retained in the auxiliary-charge weighing portion is within the predetermined allowable range of the target weight Wt, the powder retained in the primary-charge weighing portion and the auxiliary-charge weighing portion is discharged, when the sum W1+W2 is larger than an upper limit of the predetermined allowable range of the target weight Wt, the powder retained only in the primary-charge weighing portion is discharged without discharging the powder from the auxiliary-charge weighing portion.

5. A powder-weighing apparatus for weighing powder within a predetermined allowable range of a target weight Wt, the apparatus comprising:

a powder-charging device for continuously charging a powder;

a primary-charge weighing portion having weighing means for weighing while the powder being charged from the powder-charging device and retaining a weight W1 of primary-charge powder smaller than the target weight Wt;

another powder-charging device for continuously charging a powder; and one auxiliary-charge weighing portion having weighing means for weighing while the powder is being charged from the powder-charging device and retaining a weight W2 of auxiliary-charge powder within a predetermined range of an auxiliary-charge weight Ws, wherein powder is charged in such a way that a sum W1+W2 of a weight W1 of the powder in the primary-charge weighing portion and a weight W2 of the powder in the auxiliary-charge weighing portion becomes within the predetermined allowable range of the target weight Wt, when the sum W1+W2 of the weight W1 of the powder retained in the primary-charge weighing portion and the weight W2 of the powder retained in the auxiliary-charge weighing portion is within the predetermined allowable range of the target weight Wt, the powder retained in the primary-charge weighing portion and the auxiliary-charge weighing portion is discharged, and when the sum W1+W2 is larger than an upper limit of the predetermined allowable range of the target weight Wt, the powder retained only in the primary-charge weighing portion is discharged without discharging the powder from the auxiliary-charge weighing portion.

6. The powder-weighing apparatus according to claim 4, wherein the powder is made of granular material, and the auxiliary-charge weight Ws is in integral multiples of an average weight of one particle of the granular material.

7. A powder-weighing apparatus for weighing powder within a predetermined allowable range of a target weight Wt, the apparatus comprising:

a powder-charging device for continuously charging a powder;

a primary-charge weighing portion having weighing means for weighing while the powder is being charged from the powder-charging device and retaining a weight W1 of primary-charge powder smaller than the target weight Wt; and at least two auxiliary-charge weighing portions each having weighing means for weighing while the powder is charged from the powder-charging device and retaining a weight W2 of auxiliary-charge powder within a predetermined range of an auxiliary-charge weight Ws, wherein powder is charged in such a way that a sum W1+W2 of a weight W1 of the powder in the primary-charge weighing portion and a weight W2 of the powder in one of the two auxiliary-charge weighing portions becomes within the predetermined allowable range of the target weight Wt, when the sum W1+W2 of the weight W1 of the powder retained in the primary-charge weighing portion and the weight W2 of the powder retained in the one of the two auxiliary-charge weighing portion is within the predetermined allowable range of the target weight Wt, the powder retained in the primary-charge weighing portion and the one of the two auxiliary-charge weighing portions is discharged, when the sum W1+W2 of the weight W1 of the powder retained in the primary-charge weighing portion and the weight W2 of the powder retained in the one of the two auxiliary-charge weighing portions is smaller than a lower limit of the predetermined allowable range of the target weight Wt, the powder retained in the other of the two auxiliary-charge weighing portions is discharged in addition to the powder retained in the primary-charge weighing portion and the one of the two auxiliary-charge weighing portions;

when the sum W1+W2 of the weight W1 of the powder retained in the primary-charge weighing portion and the weight W2 of the powder retained in the one of the two auxiliary-charge weighing portions is larger than an upper limit of the predetermined allowable range of the target weight Wt, the powder retained only in the primary-charge weighing portion is discharged without discharging the powder from the one of the two auxiliary-charge weighing portions.

8. A powder-weighing apparatus for weighing powder within a predetermined allowable range of a target weight Wt, the apparatus comprising:
a powder-charging device for continuously charging a powder;
a primary-charge weighing portion having weighing means for weighing while the powder is being charged from the powder-charging device and retaining a weight W1 of primary-charge powder smaller than the target weight Wt;
at least two other powder-charging devices for continuously charging a powder; and
at least two auxiliary-charge weighing portions each having weighing means for weighing while the powder is charged from one of said other powder-charging devices and retaining a weight W2 of auxiliary-charge powder within a predetermined range of an auxiliary-charge weight Ws, wherein
powder is charged in such a way that a sum W1+W2 of a weight W1 of the powder in the primary-charge weighing portion and a weight W2 of the powder in one of the two auxiliary-charge weighing portions becomes within the predetermined allowable range of the target weight Wt;

when the sum W1+W2 of the weight W1 of the powder retained in the primary-charge weighing portion and the weight W2 of the powder retained in the one of the two auxiliary-charge weighing portion is within the predetermined allowable range of the target weight Wt, the powder retained in the primary-charge weighing portion and the one of the two auxiliary-charge weighing portions is discharged;

when the sum W1+W2 of the weight W1 of the powder retained in the primary-charge weighing portion and the weight W2 of the powder retained in the one of the two auxiliary-charge weighing portions is smaller than a lower limit of the predetermined allowable range of the target weight Wt, the powder retained in the other of the two auxiliary-charge weighing portions is discharged in addition to the powder retained in the primary-charge weighing portion and the one of the two auxiliary-charge weighing portions;

when the sum W1+W2 of the weight W1 of the powder retained in the primary-charge weighing portion and the weight W2 of the powder retained in the one of the two auxiliary-charge weighing portions is larger than an upper limit of the predetermined allowable range of the target weight Wt, the powder retained only in the primary-charge weighing portion is discharged without discharging the powder from the one of the two auxiliary-charge weighing portions.

9. The powder-weighing apparatus according to claim 7, wherein the powder is made of granular material, and the auxiliary-charge weight Ws is in integral multiples of an average weight of one particle of the granular material.

10. A powder-weighing method for weighing powder within a predetermined allowable range of a target weight Wt, the method comprising the steps of:
weighing a weight W1 of primary-charge powder within the predetermined allowable range of the target weight Wt while the powder being is being charged;
weighing a weight W2 of auxiliary-charge powder within a predetermined range of an auxiliary-charge weight Ws while the powder being is being charged;
discharging only the primary-charge powder when the weight W1 of the primary-charge powder is within the predetermined allowable range of the target weight Wt, and
discharging the primary-charge powder and the auxiliary-charge powder when the weight W1 of the primary-charge powder is smaller than a lower limit of the predetermined allowable range of the target weight Wt.

11. The powder-weighing method according to claim 10, wherein the powder is made of granular material, and the auxiliary-charge weight Ws is in integral multiples of an average weight of one particle of the granular material.

12. A powder-weighing method for weighing powder within a predetermined allowable range of a target weight Wt, the method comprising the steps of:
weighing a powder while the powder is being charged in such a way that a sum W1+W2 of a weight W1 of primary-charge powder smaller than the target weight Wt and a weight W2 of one auxiliary-charge powder within an allowable range of an auxiliary-charge weight Ws becomes within the predetermined allowable range of the target weight Wt;
discharging the primary-charge powder and the auxiliary-charge powder when the sum W1+W2 is within the predetermined allowable range of the target weight Wt; and
discharging only the primary-charge powder when the sum W1+W2 is larger than an upper limit of the predetermined allowable range of the weight Wt.

13. The powder-weighing method according to claim 12, wherein the powder is made of granular material, and the auxiliary-charge weight Ws is in integral multiples of an average weight of one particle of the granular material.

14. A powder-weighing method for weighing powder within a predetermined allowable range of a target weight Wt by weighing primary-charge powder smaller than the target weight Wt and at least two auxiliary-charge powders within a predetermined range of an auxiliary-charge weight Ws, the method comprising the steps of:

weighing a powder while the powder is being charged in such a way that a sum W1+W2 of a weight W1 of the primary-charge powder smaller than the target weight Wt and a weight W2 of one of the at least two auxiliary-charge powders within the predetermined range of the auxiliary-charge weight Ws becomes within the predetermined allowable range of the target weight Wt;

discharging the primary-charge powder and the one of the at least two auxiliary-charge powders when the sum W1+W2 of the weight W1 of the primary-charge powder and the weight W2 of the one of the at least auxiliary-charge powder is within the predetermined allowable range of the target weight Wt;

discharging the other of the at least two auxiliary-charge powders in addition to the primary-charge powder and the one of the at least two auxiliary-charge powders when the sum W1+W2 of the weight W1 of the primary-charge powder and the weight W2 of the one of the at least two auxiliary-charge powders is smaller than a lower limit of the predetermined allowable range of the target weight Wt; and discharging only the primary-charge powder without discharging the one of the at least two auxiliary-charge powders when the sum W1+W2 of the weight W1 of the primary-charge powder and the weight W2 of the one of the at least two auxiliary-charge powders is larger than an upper limit of the predetermined allowable range of the target weight Wt.

15. The powder-weighing method according to claim 14, wherein the powder is made of granular material, and the auxiliary-charge weight Ws is in integral multiples of an average weight of one particle of the granular material.

* * * * *